US009833008B2

(12) United States Patent
Kimmel et al.

(10) Patent No.: US 9,833,008 B2
(45) Date of Patent: Dec. 5, 2017

(54) EMULSIFYING SALT-FREE CHEESE AND METHOD OF MAKING THEREOF HAVING A BLEND OF SHEARED AND NON-SHEARED FAT

(71) Applicant: Kraft Foods Group Brands LLC, Chicago, IL (US)

(72) Inventors: Jennifer Louise Kimmel, Evanston, IL (US); Amanda Jane Criezis, Annville, PA (US); Olugbenga Diyaolu, Round Lake, IL (US); Tracy Joella Sanborn, Glen Ellyn, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 43 days.

(21) Appl. No.: 15/134,017

(22) Filed: Apr. 20, 2016

(65) Prior Publication Data

US 2016/0227806 A1      Aug. 11, 2016

Related U.S. Application Data

(63) Continuation of application No. 13/789,404, filed on Mar. 7, 2013, now abandoned.

(51) Int. Cl.
  *A23C 19/082*  (2006.01)
  *A23C 19/08*  (2006.01)
(52) U.S. Cl.
  CPC ............ *A23C 19/082* (2013.01); *A23C 19/08* (2013.01); *A23C 2250/054* (2013.01)
(58) Field of Classification Search
  CPC ....... A23C 20/00; A23C 19/09; A23C 19/097; A23C 19/0917; A23C 19/08; A23C 19/082; A23C 2250/054

USPC .......................................................... 426/582
See application file for complete search history.

(56) References Cited

U.S. PATENT DOCUMENTS

| | | |
|---|---|---|
| 1,737,770 A | 12/1929 | Parsons |
| 3,993,786 A | 11/1976 | Arenson |
| 4,104,413 A | 8/1978 | Wynn et al. |
| 4,207,350 A | 6/1980 | Ueno et al. |
| 4,552,774 A | 11/1985 | Gronfor |
| 4,744,998 A | 5/1988 | van Gennip et al. |
| 5,064,660 A | 11/1991 | Silver |
| 5,240,724 A | 8/1993 | Otto et al. |
| 5,470,595 A | 11/1995 | Kopp et al. |
| 5,750,177 A | 5/1998 | Yee et al. |
| 5,902,625 A | 5/1999 | Barz et al. |

(Continued)

FOREIGN PATENT DOCUMENTS

| | | |
|---|---|---|
| EP | 0963701 | 12/1999 |
| EP | 2027776 | 2/2009 |
| WO | 0141578 | 6/2001 |

OTHER PUBLICATIONS

PCT International Search Report dated May 27, 2014, for PCT Application No. PCT/US2014/019839.

*Primary Examiner* — Jeffrey P Mornhinweg
(74) *Attorney, Agent, or Firm* — Fitch, Even, Tabin & Flannery LLP

(57) ABSTRACT

Emulsifying salt-free, process cheese and methods of preparing such emulsifying salt-free, process cheese are described herein obtained from blends of sheared and non-sheared amounts of fat in order to form a cheese product with a unique bimodal particle size distribution. The methods and cheese achieve fat-to-protein stabilities in a processed cheese that offers both good meltability and low oiling-off during heating without emulsifying salts.

14 Claims, 5 Drawing Sheets

(56) References Cited

U.S. PATENT DOCUMENTS

| | | |
|---|---|---|
| 5,935,634 A | 8/1999 | Gamay et al. |
| 5,996,475 A | 12/1999 | Smith |
| 6,177,118 B1 | 1/2001 | Blazey et al. |
| 6,358,551 B1 | 3/2002 | Sadowsky, IV |
| 6,426,102 B1 | 7/2002 | Isom et al. |
| 6,440,481 B1 | 8/2002 | Gascoigne et al. |
| 6,475,538 B2 | 11/2002 | Thakar |
| 6,475,545 B2 | 11/2002 | Borwankar et al. |
| 6,827,961 B1 | 12/2004 | Bell et al. |
| 6,861,080 B2 | 3/2005 | Kent |
| 7,279,192 B2 | 10/2007 | Abboud et al. |
| 7,582,323 B2 | 9/2009 | Aird et al. |
| 7,651,715 B2 | 1/2010 | Merrill |
| 2003/0054068 A1 | 3/2003 | Dybing |
| 2004/0037920 A1 | 2/2004 | Choulet et al. |
| 2004/0076729 A1 | 4/2004 | Jaskulka |
| 2006/0034994 A1 | 2/2006 | Abboud |
| 2008/0187634 A1 | 8/2008 | Rasmussen et al. |
| 2009/0068311 A1 | 3/2009 | Lucey et al. |
| 2009/0092730 A1 | 4/2009 | Smith |

EMULSIFYING SALT-FREE CHEESE AND METHOD OF MAKING THEREOF HAVING A BLEND OF SHEARED AND NON-SHEARED FAT

CROSS-REFERENCE TO RELATED APPLICATIONS

This application is a continuation of U.S. application Ser. No. 13/789,404 filed Mar. 7, 2013, which is incorporated herein by reference in its entirety.

FIELD

The present disclosure relates to process cheese products, which are free of significant levels of emulsifying salts, and methods of producing such cheese products. The cheese and cheese products described herein advantageously are resistant to separation during and after heating and retain desirable organoleptic and melting properties without the use of significant levels of emulsifying salts.

BACKGROUND

Process cheese is a type of cheese that, in some aspects, has distinct technical advantages over natural cheese. For example, process cheese often has an extended shelf-life in comparison to natural cheese, tends to be resistant to separation when cooked, demonstrates a desired melting profile, and can be formed into a wide variety of product forms (e.g., slices, loaves, sauces, dips, and the like). Process cheese is produced by comminuting and mixing together natural cheese, other dairy ingredients, emulsifiers, salt, and optionally food colorings. Various types of natural cheese, as well as blends, thereof may be used to provide desirable flavor and texture profiles in processed cheese.

Previously, emulsifying salts were used to form process cheese that melts smoothly when cooked, without separating into different phases, or providing undesirable melt restriction (that is, fails to melt or has an appreciably decreased melt profile). The most common emulsifying salts used in process cheese include sodium and potassium citrates, monophosphates, and polyphosphates to suggest a few. It was believed that the emulsifying salts function in many ways to aid in increased stability to the cheese. For instance, it is believed that the emulsifying salts complex with calcium ions in the cheese to help solubilize the protein, increase protein hydration and swelling, facilitate emulsification of fat, and adjust and stabilize pH. Emulsifying salts reduce the tendency for fat globules in the cheese to coalesce and pool on the surface of the molten cheese. Emulsifying salts allowed a cheesemaker to pasteurize the cheese product without deterioration of the cheese texture and melt characteristics.

Emulsifying salts, however, tend to modify the flavor of the natural cheeses by providing a milder and saltier flavor profile. In addition, processed cheese generally contains higher levels of sodium than natural cheese since processed cheese contains sodium based emulsifying salts as well as sodium chloride.

Consumers are increasingly aware of the composition of foods. Thus, there is a desire to prepare processed cheese with more natural ingredients and with less or even without emulsifying salts. Prior attempts at producing a processed cheese without emulsifying salts, however, have compromised one or more of the desired characteristics of the processed cheese. For instance, some emulsifying salt-free cheese preparations have focused on decreasing the calcium content of one or more dairy ingredients in the cheese product. Processed cheese without emulsifying salts has been prepared through the use of a calcium reduced casein sources; however, some approaches tended to produce a melt restricted cheese that was not suitable for all types of cheeses. In other approaches, cheese products prepared without emulsifying salts have relied heavily on starches and hydrocolloid stabilizers to provide in-process and final product stability. These approaches, however, result in several disadvantages to the resultant cheese. The starches and hydrocolloids often add textures and flavors to the final product that, again, is unsuitable for some types of cheeses. The use of starches and hydrocolloids may also inhibit flavor release, and often leads to a starchy and/or undesirable flavors, textures, and mouthfeel. In other cases, processed cheeses without emulsifying salts may be prepared by modifying and/or essentially removing all the casein from the cheese. As casein is one of the predominate dairy proteins in cheese, it can be appreciated that a casein-less or a substantially casein-reduced cheese will tend to lack the full flavor of more natural cheeses.

SUMMARY

In one aspect, a method of making an emulsifying salt-free cheese is provided. The cheeses and methods herein include a total fat amount provided from both sheared and non-sheared fat. By one approach, the method includes shearing a pre-mixture of a first portion of the total fat amount and dairy protein to generate an emulsion having sheared fat particles of a first size distribution. Then, the method blends at least one cheese with a second portion of the total fat amount to form a uniform blend having non-sheared fat particles of a second particle size distribution. The uniform blend is heated into a process cheese. The emulsion having the sheared fat particles is blended or mixed with the uniform blend having the non-sheared fat particles during one of the blending or the heating in a select ratio of the sheared fat particles to the non-sheared fat particles from about 10:90 to about 50:50 to form an emulsifying salt-free cheese. In another aspect of the method, one of the shearing, the ratio selection, and mixtures thereof is selected to produce the emulsifying salt-free cheese with a bimodal particle size distribution having a first mode with an average particle size of about 1 micron to about 10 microns and a second mode with an average particle size greater than about 10 microns and less than about 100 microns.

In another aspect of the disclosure, an emulsifying salt-free cheese is described having stable blends and/or a stable interface of protein and fat without significant amounts or being free of emulsifying salts. In this aspect, the cheese includes at least one natural cheese or blends of natural cheeses and a casein source, such as a modified or functional casein source like a calcium reduced casein source having about 100 to about 350 ppm calcium per percentage of casein. In some approaches, the cheese includes a total amount of protein provided from protein in the at least one natural cheese or blends thereof and also from protein in the casein source. The cheese also includes a portion of its fat, and in some cases, a portion of its fat and protein sheared or emulsified. In some approaches, the cheese includes about 5 to about 35 percent total fat provided from a blend of emulsified or sheared fat and non-emulsified or non-sheared fat in a ratio of the emulsified or sheared fat to the non-emulsified or non-sheared fat from about 10:90 to about 50:50. The cheese is free of substantial amounts of emulsifying salts such that, in one approach, the cheese has about 0.5 percent or less of emulsifying salts. The cheese also has a bimodal particle size distribution having a first mode with an average particle size from about 1 micron to about 10 microns and a second mode having an average particle size greater than about 10 microns and less than about 100 microns. In another approach, a percentage of particles in the first mode is less than a percentage of particles in the second mode.

As mentioned in the background, prior attempts to form a process cheese without emulsifying salts all tend to have one or more shortcomings. The application of shear may be utilized to achieve a stable emulsion of fat and protein and less undesirable oiling-off in the finished cheese product. However, it has been previously observed that, when high shear is applied to process cheese-type cheese prepared without emulsifying salts, undesirable melt restriction occurs because the resultant cheese does not melt as easily as traditional emulsifying salt containing cheese. High shear also causes melt restriction in traditional processed cheese containing emulsifying salts. The methods and cheese of the present disclosure overcome this shortcoming by selecting a unique blend of sheared and non-sheared fat with particular amounts and distributions of fat and other dairy ingredient particle sizes.

DETAILED DESCRIPTION

Figure 1:
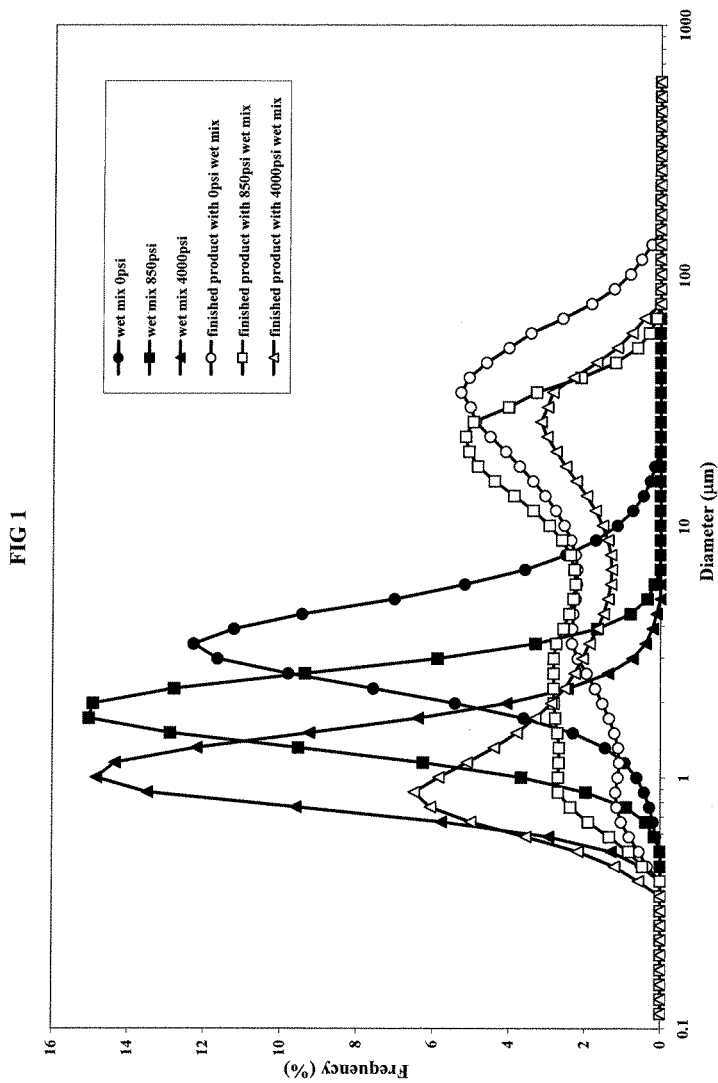
FIG. 1. is a graph of particle size.

Emulsifying salt-free, process cheese and methods of preparing such emulsifying salt-free, process cheese are described herein obtained from blends of emulsified or sheared fat and non-emulsified or non-sheared fat in order to form a cheese product with a unique bimodal particle size distribution that achieves fat-to-protein stabilities in a processed cheese that offers both good meltability and low oiling-off during heating. The unique cheese and methods of obtaining such cheese herein can provide the benefits of traditional process cheese containing emulsifying salts, such as resistance to separation during heating, low oiling-off, and desirable organoleptic properties, while also avoiding the undesirable melt restriction of prior processed cheeses formed without emulsifying salts.

During process cheese manufacturing, shear is often imparted to the cheese to improve the stability of protein and fat. However, it has been observed that, when shear was previously applied to process cheese-type products, and especially to such products prepared without emulsifying salts or when large amounts of sheared fat were used in processed cheese without emulsifying salts, there tended to be a loss of flavor, firmer textures, and undesirable melt restriction because the resultant cheese did not melt as easily as traditional emulsifying salt containing cheese. The cheese products described herein, on the other hand, advantageously are resistant to separation during and after heating and retain desirable organoleptic and melting properties without the use of significant levels of emulsifying salts even when using sheared material.

In one aspect, a method is provided for preparing an emulsifying salt-free cheese product that forms a unique bimodal particle size distribution of the cheese and, in particular, the fat particles in the cheese. The products and methods herein are able to achieve the benefits of applying shear, but at the same time unexpectedly obtain good melting products, which is typically the opposite of using large amounts of shear in processed cheese. In one approach, the method includes shearing a pre-mixture of a first portion of the cheese's total fat together with an amount of dairy protein to form an emulsion having sheared fat particles of a first size distribution. It is believed that the shearing forms a stable fat to protein interface where the fat may be coated with a layer of the dairy proteins.

Next, a separate blend is formed with at least one natural cheese or blends of natural cheese with a second portion of the total fat amount to form a uniform blend having non-sheared fat to form a second particle size distribution. Generally, the second particle size distribution has a larger average particle size than that of the first particle size distribution. This blend is then heated for a time and temperature effective to form a cheese product or a processed cheese product. Either during the blending step or the heating step, the emulsion of the sheared fat mentioned above is blended with the non-sheared fat at select levels in a ratio of the sheared fat particles to the non-sheared fat-particles from about 10:90 to about 50:50. In some approaches, one of the shearing, the ratio selection, and mixtures thereof produce and/or are selected to form the emulsifying salt-free cheese with a continuous bimodal particle size distribution having a first particle size mode with an average particle size of about 1 micron to about 10 microns (in some approaches, greater than about 1 micron and less than about 10 microns) and a second particle size mode with an average particle size greater than about 10 microns and less than about 100 microns.

While not wishing to be limited by theory, it is believed that the first or smaller size particle mode is selected to and defines a particle size distribution to increase cheese firmness and reduce oil spread upon heating. The second, larger size particle mode is combined with the smaller mode to provide and to define a particle size distribution to increase meltability of the cheese at the same time. If too much of the sheared cheese, too large of a first mode, or too small of particles in the first mode are in the cheese, then it offers poor meltability and it becomes melt restricted. Thus, the combination and relative amounts and sizes of particles in the two particle size modes aids in and is effective in achieving the good firmness, oil-out properties, meltability, and flavor all at the same time in a processed cheese without significant level of emulsifying salts.

In another aspect, a processed cheese type product is provided that is free of significant levels of emulsifying salts that exhibits good firmness, oil-out properties, meltability, and flavor release. In one approach, the cheese includes at least one natural cheese or blends of natural cheeses and one or more dairy protein sources, such as a modified or functional dairy protein source like a calcium-reduced casein source having about 100 to about 350 ppm calcium per percentage of casein (in other approaches, about 100 to about 200 ppm calcium per percent of casein). The cheese may also include about 5 to about 35 percent total fat (in some cases, about 5 to about 15 percent) that is provided from a blend of both emulsified and/or sheared fat combined with non-emulsified and/or non-sheared fat. The cheese may also include blends of sheared and non-sheared protein, such as casein. In one approach, a ratio of the emulsified to the non-emulsified fat may be from about 10:90 to about 50:50. In yet another approach, the cheese also has a bimodal particle size distribution as described above. In some approaches and as discussed more below, a percentage of particles in the first mode may be less than a percentage of particles in the second mode.

As used herein, the discussion of an ingredient, such as emulsifying salts, being absent from, not in significant levels, not present, without, free of, having substantially no, not included in, and/or present in essentially no amounts in the cheese generally means that the ingredient is present at about 0.5 percent or less, in other approaches, about 0.1 percent or less, in yet other approaches, about 0.05 percent or less, and in some cases not present at all. In other words, providing no functional benefit. To this end, the present disclosure relates to process cheese products, which are free of significant levels of emulsifying salts, and methods of producing such cheese products.

Turning to more of the specifics of the methods and cheese, the pre-mixture includes a first portion of the cheese's total fat and total dairy protein. The pre-mix or pre-mixture may be in any suitable form. By one approach, the first or pre-mixture may include, for example, a so-called wetmix (or slurry) containing water, a portion of the total fat, and various dairy proteins. In other approaches, the first or pre-mixture may be a dairy mixture containing or selected from a liquid or dry dairy ingredient, a portion of the total fat, and dairy protein (such as a natural cheese), an emulsifying salt-free cheese product, and the like, and mixtures thereof. In one approach, the wetmix or pre-mixture may include about 45 to about 65 percent water, and in other approaches, about 50 to about 62 percent water, and in yet other approaches, about 48 to about 50 percent water.

Suitable fats for use in wetmix or pre-mixture include, for example, edible milk fats, plant fats, and animal fats. In one form, the fat is anhydrous milk fat. In one approach, the wetmix or pre-mixture may include about 20 to about 45 percent fat, in other approaches, about 20 to about 26 percent fat, and in yet other approaches about 30 to about 42 percent fat.

Suitable protein for use in wetmix or pre-mixture include, for example, dairy proteins, milk protein concentrates, whey protein concentrates, whey protein isolates, and the like, and mixtures thereof. In one form, the protein is a modified or functional milk protein, such as, a calcium-reduced casein source. Suitable liquid dairy proteins included, for example, whole milk, reduced fat milk, fat-free milk, skim milk, cream, whey, and the like, and mixtures there of. They may be in natural liquid form, concentrated liquid form, dried form, or liquid form made from reconstituted solids. In some approaches, the wetmix or pre-mixture may include about 3 to about 20 percent dairy protein, and in other approaches, about 3 to about 11 percent dairy protein, and in yet other approaches about 15 to about 20 percent dairy protein.

Casein is the general name for the dominant class of proteins present in milk, and is essentially the protein left in cheese after the whey (including the whey protein) has been drained off. Most types of casein have calcium phosphate groups. The higher the level of calcium, the less soluble the casein in the cheese product. One of the prior functions of emulsifying salts in previous types of process cheese was to bind the calcium, increasing the solubility of the casein and enabling the casein to emulsify the fat. In the present case, however, a calcium-reduced casein source may be used in the cheese in one approach. While not wishing to be limited by theory, it is thought that at least in part, the calcium reduced casein source, which has a higher solubility, compensates for the low solubility in the conventionally made natural cheese so that when the two are blended, mixed, and heated, the resulting blend has sufficient solubility at a microscopic level for a stable emulsion. The finished product is sufficiently soluble as to resemble process cheese in terms of smoothness and homogeneity in the cooking process and finished product. Homogenization tends to create even better mixing at a microscopic level, and results in enhanced smoothness, creaminess, and stability of the emulsion. In some instances, however, use of this type of casein tends to result in melt-restricted cheese that does not demonstrate a desired melting profile.

The calcium-reduced casein used in the present cheese products and methods may be produced by any known means. Methods for producing calcium-reduced casein are described, for example, in U.S. Patent Application Publication No. 2003/0054068 to Dybing et al. and WO 01/041578 to Bhaskar, both of which are hereby incorporated herein by reference. In one approach, the calcium-reduced casein used in this disclosure is produced by ultrafiltration alone or in combination with diafiltration. In one approach, the calcium-reduced casein source contained in the cheese described herein may be produced using ultrafiltration, diafiltration, cation exchange, acidification, dialysis, chelation, as well as similar techniques and combinations thereof. One calcium-reduced casein source can be obtained using ultrafiltration alone or in combination with diafiltration. In some approaches, the wetmix or pre-mixture may include about 3 to about 17 percent casein, and in other approaches, about 3 to about 9 percent casein (which is included in the dairy protein amounts mentioned above). The protein and/or casein in the wetmix is sheared.

In some approaches, the calcium-reduced casein source should have less than about 350 ppm calcium per percent casein, in other approaches, less than about 200 ppm calcium per percent casein, in other approaches, less than about 175 ppm calcium per percent casein, and in yet other approaches, less than about 150 ppm calcium per percent of casein. In other instances, the calcium-reduced casein source (and the resultant cheese) may have about 50 to about 350 ppm, in some approaches, about 50 to about 150 ppm, in other approaches, about 50 to about 140 ppm of calcium per percent of casein. The calcium-reduced casein source may range from a liquid to a powder. For example, one commercially available calcium-reduced casein source is Nutrilac CH-7813 from Arla Foods (a powder which contains about 61.5 percent casein and has a calcium level of about 10,400 ppm); it contains about 170 ppm calcium per percent casein. Other suitable calcium-reduced casein sources include calcium reduced skim milk liquid having a moisture level of about 82.8 percent, a casein level of about 10.4 percent, and a calcium level about 1,440 ppm. Thus, it contains about 139 ppm calcium per percent casein.

Generally, the process cheese products herein have less than about 325 mg sodium/oz, in some approaches, less than about 270 mg sodium/oz, and in other approaches, less than about 240 mg sodium/oz. These levels enable the cheese to maintain perceived saltiness at levels normally associated with process cheese.

In one form, the first or pre-mixture is a wetmix containing water, anhydrous milk fat, and the calcium reduced casein. In another form, the first or pre-mixture is a natural cheese or blend of natural cheeses, such as an emulsifying salt-free processed cheese. The natural cheese in the wet or pre-mixture generally refers to unpasteurized cheese made by curdling milk using some combination of rennet (or rennet substitutes) and acidification. In some cases, cheese prepared by ultrafiltration is not desired. The natural cheese may include one or more different varieties, including, for example, freshly made, aged, full fat, and/or reduced fat. In yet another form, the first or pre-mixture is an emulsifying salt-free cheese product such as described in U.S. Patent Application Publication No. 2009/0092730, which his incorporated herein by reference in its entirety. In whatever form the pre-mixture takes, it includes only a portion of the fat from the final processed cheese product. The portion of the fat in the pre-mixture is sheared or has a modified particle size distribution different from native or un-sheared fat.

The first or pre-mixture is then treated, processed, or otherwise sheared to generate an emulsion, dispersion, and/or mixture having sheared fat particles (and in some instances sheared dairy particles) of a first particle size distribution. Examples of treatments to generate an emulsion may include, for example, high pressure homogenization, high shear mixing, ultrasound processing, cavitation, and the like, and combinations thereof. If homogenization is used, homogenization may be single or dual stage homogenization using pressure from about 800 to about 4000 psi, in other approaches, about 850 to about 2500 psi, and in yet other approaches, about 1000 to about 2000 psi. If high shear mixing is used, the shear may be at about 10 to about 50 hertz, in other approaches, about 10 to about 35 hertz, and in yet other approaches, about 20 to about 30 hertz.

The pre-mix is then combined with a second portion of the cheese that does not include sheared or emulsified fat (or sheared dairy proteins). In other words the non-sheared or non-emulsified portion (fat, protein, and other ingredients) has not been subjected to the processing steps of the previous paragraph and generally processed at conditions below that described in the previous paragraph. In some approaches, the pre-mix and/or the sheared fat particles therein may constitute about 10 to about 50 percent of the total cheese and/or the total fat particles in the cheese to provide a first fat particle size mode having a fat particles size distribution with an average particles size between about 1 and about 10 microns. The first or pre-mixture may be blended with the remaining cheese ingredients during a blending step, during a heating step, or various combinations thereof. The remaining cheese ingredients include the remainder of the fat that is not-sheared or not-emulsified. Thus, in one approach, a ratio of a first amount of sheared fat to a second amount of non-sheared fat is in a range of about 10:90 to about 50:50. Thus, emulsifying salt-free cheese products prepared by such a method have a blend of sheared and non-sheared fat and a bimodal fat particle size distribution formed from a portion of sheared fat and a portion of non-sheared fat and other dairy ingredients. This bimodal particle size distribution is described in more detail in the examples.

The pre-mixture is blended or combined with at least one un-sheared natural cheese or a blend of natural cheeses. As above, the natural cheese used in this step may also refer to unpasteurized cheese made by curdling milk using some combination of rennet (or rennet substitutes) and acidification. The natural cheese may include one or more different varieties, including, for example, freshly made, aged, full fat, and/or reduced fat.

The blend of non-sheared ingredients forms a uniform mixture or blend of non-sheared fat and non-sheared dairy ingredients having a different, larger particle size distribution than the sheared materials from the first or pre-mixture. In one approach, the blend of non-sheared ingredients has an average particle size of greater than about 10 microns and less than about 100 microns (in some approaches, about 10 to about 100 microns). In other approaches, the portion of the fat in the non-sheared portion may include a particle size distribution that substantially retains the size distribution of the native fat particles in cheese. When combined with the first or pre-mixture of sheared fat, the combined product has a bimodal particle size distribution. To this end, the particle size distribution of the overall final cheese is a continuous bimodal or multi-modal particle size distribution that refers to a continuous distribution of particle size diameters that exhibit at least two distinctly defined modes or peaks of particle size diameters across the continuous distribution. In general, these two portions of the distribution refer to a coarser or larger particle size mode that aids in the meltability of the final cheese and a smaller or finer particle size mode that aids in the increased firmness and low oil spread of the final cheese. Thus, it is believed that the selected blend and the selected amounts of particles sizes in the two modes combine to form the final cheese with all the desired properties. Deviation of the amounts, relative proportions, multiple modes and/or particle sizes of the various modes compromises one or more of the desired properties.

In one approach, the amount or relative size of the first mode is about 10 to about 50 percent of the cheese, in other approaches, about 20 to about 40 percent of the cheese, and in yet other approaches, about 20 to about 30 percent. In some approaches, the total fat in the cheese is about 5 to about 15 percent where about 10 to about 50 percent of the total fat, in other approaches, about 20 to about 40 percent of the total fat, and in yet other approaches, about 20 to about 30 percent of the total fat is sheared or modified from its native or original state. This leads, in some approaches, where the amount of particles in the first mode is less than the amount or percentage of particles in the second or larger mode.

The cheese product may also include optional additional ingredients, for example, to improve texture, flavor, nutrition, anti-microbial properties and/or cost attributes. These optional ingredients may include, but are not limited to, sodium chloride, sorbic acid, whey derived ingredients (e.g., whey protein concentrate), non-fat dry milk, milk protein concentrate, anhydrous milk fat, gums, starches, gelatin, and the like, and combinations thereof. Other examples of such additives or ingredients include, but are not limited to colorants, flavorants, preservatives, other milk components, and the like. For example, in one approach, the cheese product may contain added milk fat in levels up to about 15 percent to achieve the desired fat targets in the finished product. In another embodiment, the cheese product contains added sodium chloride. In yet another embodiment, the cheese product contains sorbic acid.

Whey protein refers to a collection of globular proteins that can be isolated from whey, which is the liquid remaining after milk has been curdled and strained. Whey protein is typically a mixture of beta-lactoglobulin, alpha-lactalbumin, and serum albumin proteins. In one embodiment, the cheese product includes a whey protein source such as whey protein concentrate (WPC). WPC is derived from whey by conventional concentration techniques. The whey protein source may also include lactose, vitamins, minerals, and fat.

The cheese product also contains added moisture, which may be added to the blend of cheese, the calcium-reduced casein source, or the optional ingredients by any method, such as, but not limited to, injecting steam into the cooker (e.g., a laydown cooker), commingling of condensed steam from cooking, and/or direct addition of water. Of course, moisture can also enter into the system through the various ingredients. In another form, the final cheese product has a total moisture content in the range of about 45 to about 50 percent (in other approaches, about 45 to about 48 percent), a fat content of about 5 to about 35 percent (in other approaches about 26 to about 32 percent), and a protein content of about 15 to about 21 percent (in other approaches about 18 to about 20 percent).

The shear device used to form the wetmix, first mixture, or pre-mixture having the sheared or emulsified fat may be a homogenizer, an in-line high shear mixing device, or the like. As explained above, homogenization pressures may be from about 800 to about 4000 psi and shear rates in mixing devices may be about 10 to about 50 hertz. Non-sheared materials may be processed below these levels or simply blended at low shear levels.

Heating the blend or combination of the blend and pre-mixture may occur in any suitable heating device. In one approach, a lay-down cooker may be used for rapid and uniform heating of the mixture combined with optional direct injection of steam into the product.

In some forms, the resultant or final cheese product of the present disclosure includes a natural cheese or a blend of natural cheese (having the combination of sheared and non-sheared part portions discussed above) in the range of about 20 to about 90 percent cheese (preferably ground using a conventional cheese grinder), a source of dairy protein in the range of about 0 to about 20 percent (solid basis), total fat in the range of about 5 to about 35 percent (in some cases, about 5 to about 15 percent), a total casein source in the range of about 0.8 to about 20 percent (solid basis, in one approach, a calcium reduced casein source), overall moisture in the range of about 35 to about 70 percent, a total sorbic acid in the range of about 0 to about 0.20 percent, and a total added sodium chloride in the range of about 0 to about 1.7 percent. In another form, the cheese product of the present invention includes a natural cheese or a blend of natural cheese in the range of about 40 to about 60 percent, a source of dairy protein in the range of about 5 to about 20 percent (solid basis), anhydrous milk fat in the range of about 5 to about 15 percent, a calcium reduced casein source in the range of about 3 to about 15 percent (solid basis), overall moisture in the range of about 40 to about 55 percent, sorbic acid in the range of about 0.10 to about 0.20 percent, and added sodium chloride in the range of about 0.25 to about 1.5 percent. In the final cheese and in some approaches, about 10 to about 50 percent (in some cases about 20 to about 33 percent) of the total fat is sheared or emulsified as discussed herein. In other cases, the final cheese may also have about 1 to about 20 percent (in other cases about 4 to about 18 percent) of the total protein (such as the casein discussed herein) sheared or emulsified. The remainder of the total fat and total protein is not sheared or emulsified as described herein.

In one form, the cheese products herein can be heated up to about 160° F. to about 175° F. (in some cases about 165° F. to about 175° F.) to form a homogenous blend without substantial separation. In yet another approach, the cheese product is pasteurized. In one approach, the cheese product described herein may be any of a cheese dip, a cheese spread, a cheese block, a cheese slice, a shredded cheese, or the like.

As is known by one of ordinary skill in the art, the ingredients may be used in varying amounts depending on the desired outcome of the cheese product. For example, a reduced sodium cheese product may include a small amount or even no added salt in the cheese blend. A better understanding of the cheese products and methods described herein and their many advantages may be clarified with the following examples, given by way of illustration. All percentages and parts described herein are by weight unless otherwise stated.

EXAMPLES

Example 1

Processed cheese was prepared by forming a pre-mixture having varying amounts of sheared fat contributing to the total fat of the processed cheese. The pre-mixture included water, about 1 percent, about 2.5 percent, or about 4 percent of a calcium depleted milk protein concentrate, and anhydrous milk fat as shown in Table 1 below. Each pre-mixture was sheared using a homogenizer (APV Model R4932) at either about 0, 850, or 4000 psi.

TABLE 1

|  | Wetmix Formula Depending on Level of MPC (LBS) | | |
| --- | --- | --- | --- |
|  | 1% | 2.5% | 4% |
| Anhydrous Milk Fat | 2.7 | 3.4 | 4.2 |
| Calcium Depleted Milk Protein Concentrate (MPC) | 0.4 | 1.0 | 1.6 |
| Water | 5.3 | 5.9 | 6.6 |
| Total | 8.4 | 10.4 | 12.4 |

About 22 to about 33 percent of the sheared pre-mixture was then combined with an emulsifying salt-free cheese blend as shown in Table 2 below and heated in a lay-down cooker with direct steam cooking to at least about 155° F. and held for at least about 120 seconds to form a processed cheese.

TABLE 2

|  | Cheese Blend Formula Depending on Level of MPC (LBS) | | |
| --- | --- | --- | --- |
|  | 1% | 2.5% | 4% |
| Color | 0.02 | 0.02 | 0.02 |
| Cheese | 28.2 | 26.2 | 24.2 |
| Salt | 0.2 | 0.2 | 0.3 |
| Sorbic Acid | 0.02 | 0.02 | 0.02 |
| Total | 28.5 | 26.5 | 24.5 |

The processed cheese had about 41 to about 45 percent moisture and a pH of about 4.95 to about 5.06, which was consistent with target amounts of typical process cheese slice or loaf. The resultant process cheese was free of emulsifying salts and had no emulsifying salts and summarized in Table 3.

TABLE 3

|  | Final Cheese Product Depending on Level of MPC | | |
| --- | --- | --- | --- |
|  | 1% | 2.5% | 4% |
| Wetmix | 8.4 lbs | 10.4 lbs | 6.6 lbs |
| Cheese Blend | 28.5 lbs | 26.5 lbs | 24.5 lbs |
| Total Batch (Wetmix + Cheese Blend) | 37.0 lbs | 37.0 lbs | 37.0 lbs |
| Moisture, % | 45.0% | 45.0% | 45.0% |
| Fat, % | 32.0% | 32.1% | 32.2% |

TABLE 3-continued

| | Final Cheese Product Depending on Level of MPC | | |
|---|---|---|---|
| | 1% | 2.5% | 4% |
| Protein, % | 18.0% | 18.0% | 18.0% |
| Sheared Fat in Wetmix, % (Total) | 21.3% | 27.1% | 32.9% |
| Sheared Protein from Powder, % (Total) | 4.2% | 10.4% | 16.6% |

Further results are shown in Table 4 below. Referring back to Tables 1, 2, and 3, Samples 1-3 of Table 4 used about 1 percent of the MPC, Samples 4-6 of Table 4 used about 2.5 percent of the MPC, and Samples 7-9 of Table 4 used about 4 percent of the MPC. The particle size of the sheared pre-mix (wetmix, Table 1) and the particle size of the each final cheese sample (Table 3) after being combined with the cheese blend was measured using a Horiba particle size analyzer and is provided in FIG. 1, which shows the bimodal particle size distribution of the wetmix and resultant cheese from the samples including about 4 percent of the MPC at various shear levels (Samples 7-9 of Table 4). Additional properties of the resultant cheese are also shown below in Table 4. Firmness was measured using a Texture Technologies Corp. TA.XT.Plus texture analyzer. Melt spread was measured by determining the area of a cheese disc before and after melting on a double boiler for 4 minutes. Percent free oil released was measured by determining the height of free oil after centrifuging a sample of grated cheese using a Beckman Coulter Optima L-100 XP Ultracentrifuge at 40° C. Particle size peak maximum was measured using a Horiba particle size analyzer.

TABLE 4

| Sample | % total Protein in Pre-mix | % of pre-sheared fat | Homogenization pressure (psi) | Final Cheese Firmness (g) | Final Cheese melt spread (in) | Final Cheese % free oil released | Peak Particle size maximum of modes in Final Resultant cheese (um) | |
|---|---|---|---|---|---|---|---|---|
| | | | | | | | Mode 1 | Mode 2 |
| 1 | 4.2 | 21.3 | 0 | sample failed during manufacture | | | | |
| 2 | 4.2 | 21.3 | 850 | 646.33 | 2.28 | 23.81 | — | — |
| 3 | 4.2 | 21.3 | 4000 | 659.00 | 2.07 | 21.43 | — | — |
| 4 | 10.4 | 27.1 | 0 | 857.67 | 2.01 | 26.19 | — | — |
| 5 | 10.4 | 27.1 | 850 | 859.00 | 2.16 | 23.81 | — | — |
| 6 | 10.4 | 27.1 | 4000 | 875.00 | 2.10 | 21.43 | — | — |
| 7 | 16.6 | 32.8 | 0 | 833.00 | 2.23 | 26.19 | 3.5 | 35 |
| 8 | 16.6 | 32.8 | 850 | 879.25 | 2.34 | 23.81 | 2 | 25 |
| 9 | 16.6 | 32.8 | 4000 | 1015.33 | 1.87 | 21.43 | 0.9 | 25 |

Figure 2:
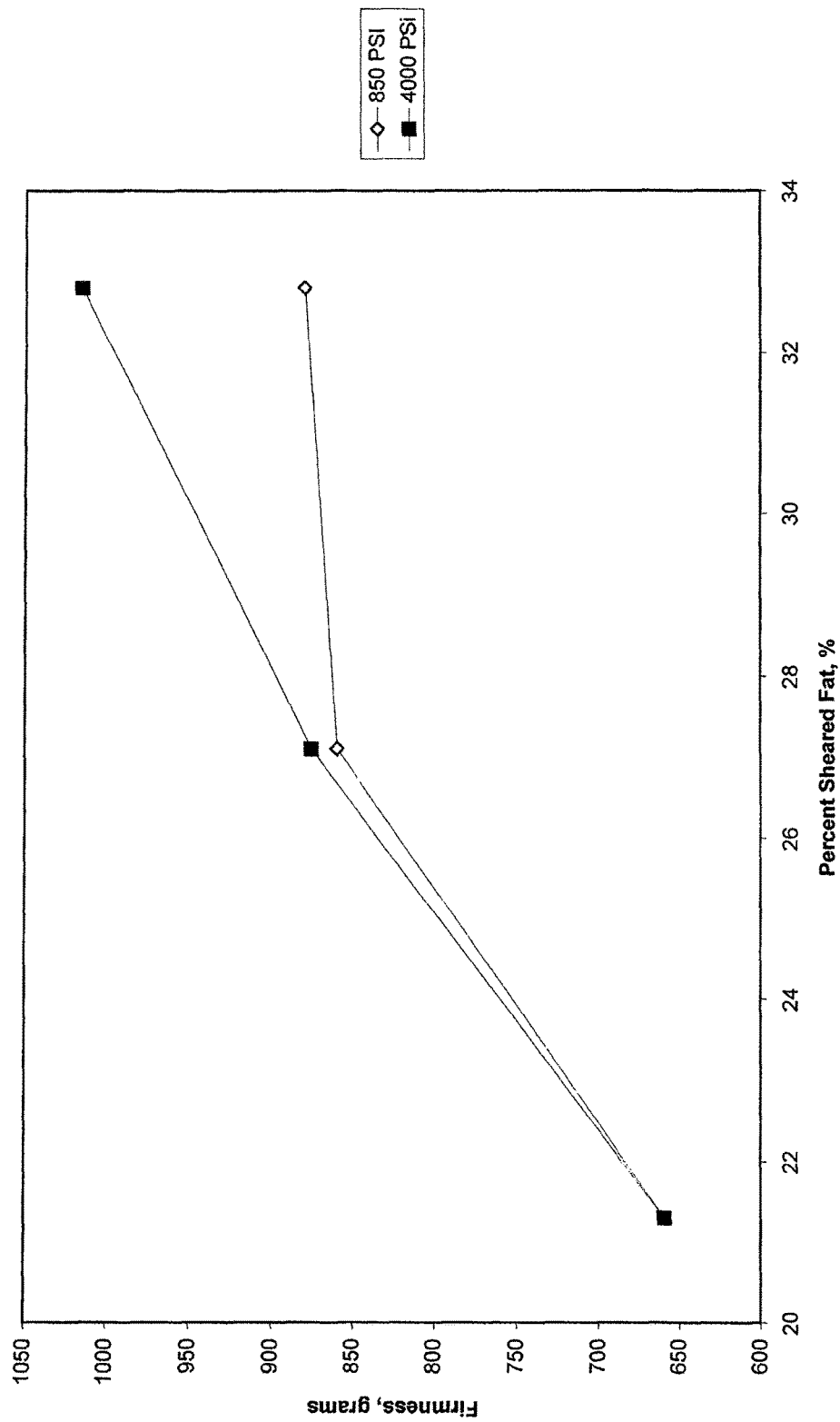
FIG. 2 is a graph of processed cheese firmness.
Figure 3:
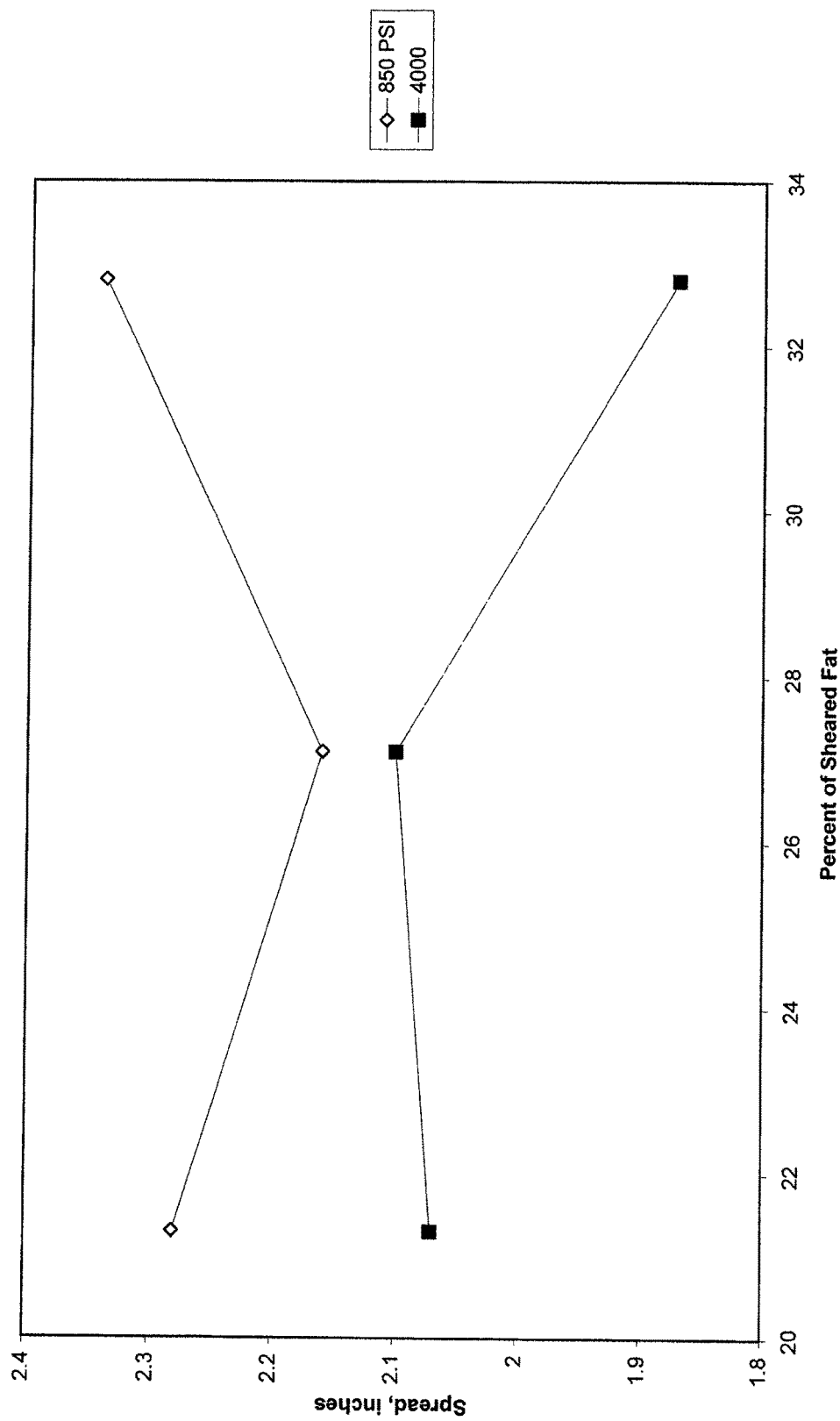
FIG. 3 is a graph of processed cheese melt spread.

FIGS. 2 and 3 show additional relationships of the melt spread, shear, and amount of fat that is sheared from these samples. In this approach, about 20 to about 30 percent of sheared fat at about 800 to about 4000 psi added to the final cheese is effective to form a processed cheese without emulsifying salts that exhibits good melting and firmness as shown in the graphs. Above 30 percent sheared fat at about 4000 psi tends to reduce melt spread and product high firmness. However, when using lower homogenization pressures at 800 psi good melt spread and firmness can be achieved over a wider range of sheared fat amounts, such as about 20 to about 35 percent sheared fat.

Example 2

Processed cheese was prepared similar to Example 1 by forming a pre-mixture having varying amounts of sheared fat contributing to the total fat of the processed cheese. The pre-mixture included water, about 2.5 percent, or about 4 percent milk protein concentrate, and anhydrous milk fat as shown in Table 5 below.

TABLE 5

| | Wetmix Formula Depending on Level of MPC (LBS) | | |
|---|---|---|---|
| | 2.5% | 4% | 4% |
| Anhydrous Milk Fat | 5.7 | 5.9 | 4.2 |
| Calcium Depleted Milk Protein Concentrate (MPC) | 1.0 | 1.6 | 1.6 |
| Water | 6.9 | 7.4 | 6.6 |
| Total | 13.5 | 14.9 | 12.5 |

This pre-mixture was sheared using a high-shear in line dispenser (dispax, IKA USA) at either about 0, 10, or 50 hertz. About 33 to about 39 percent of the sheared pre-mixture was then combined with an emulsified salt-free cheese blend set forth in Table 6 below and heated in a lay-down cooker with direct steam cooking to at least about 155° F. for about 120 seconds.

TABLE 6

| | Cheese Blend Formula Depending on Level of MPC (LBS) | | |
|---|---|---|---|
| | 2.5% | 4% | 4% |
| Color | 0.02 | 0.02 | 0.02 |
| Cheese (Low Fat) | 10 | 8.7 | 0 |

TABLE 6-continued

| | Cheese Blend Formula Depending on Level of MPC (LBS) | | |
|---|---|---|---|
| | 2.5% | 4% | 4% |
| Cheese (Full Fat) | 0 | 0 | 10 |
| Aged Cheese | 14.1 | 14.0 | 14.0 |
| Salt | 0.3 | 0.4 | 0.3 |
| Sorbic Acid | 0.02 | 0.02 | 0.02 |
| Total | 24.5 | 23.1 | 24.5 |

The processed cheese had about 41 to about 45 percent moisture and a pH of about 4.95 to about 5.06. The process cheese was free of emulsifying salts and had no emulsifying salts and generally described in Table 7 below.

TABLE 7

|  | Final Cheese Product Depending on Level of MPC | | |
| --- | --- | --- | --- |
|  | 2.5% | 4% | 4% |
| Wetmix | 13.5 lbs | 14.9 lbs | 12.5 lbs |
| Cheese Blend | 24.5 lbs | 23.1 lbs | 24.5 lbs |
| Total Batch (Wetmix + Cheese Blend) | 38.0 lbs | 38.0 lbs | 37.0 lbs |
| Moisture, % | 45.0% | 45.0% | 45.0% |
| Fat, % | 32.1% | 32.0% | 32.1% |
| Protein, % | 18.0% | 18.2% | 18.0% |
| Protein from Powder, % | 10.4% | 16.6% | 16.6% |

Further results are shown in Table 8 below. Referring back to Tables 5, 6, and 7, Samples 2 to 4 of Table 8 used about 2.5 percent of the calcium depleted MPC and used a low fat cheese in the cheese blend to allow for a higher percentage of the overall fat to be in the pre-sheared wetmix, Samples 5 to 7 of Table 8 used about 4 percent of the calcium depleted MPC and used a low fat cheese in the cheese blend to allow for a higher percentage of the overall fat to be in the pre-sheared wetmix, and Samples 8 to 10 of Table 8 used about 4 percent of the calcium depleted MPC and used a full fat cheese in the cheese blend resulting in a lower percentage of the overall fat to be contained within the pre-sheared wetmix.

Figure 4:
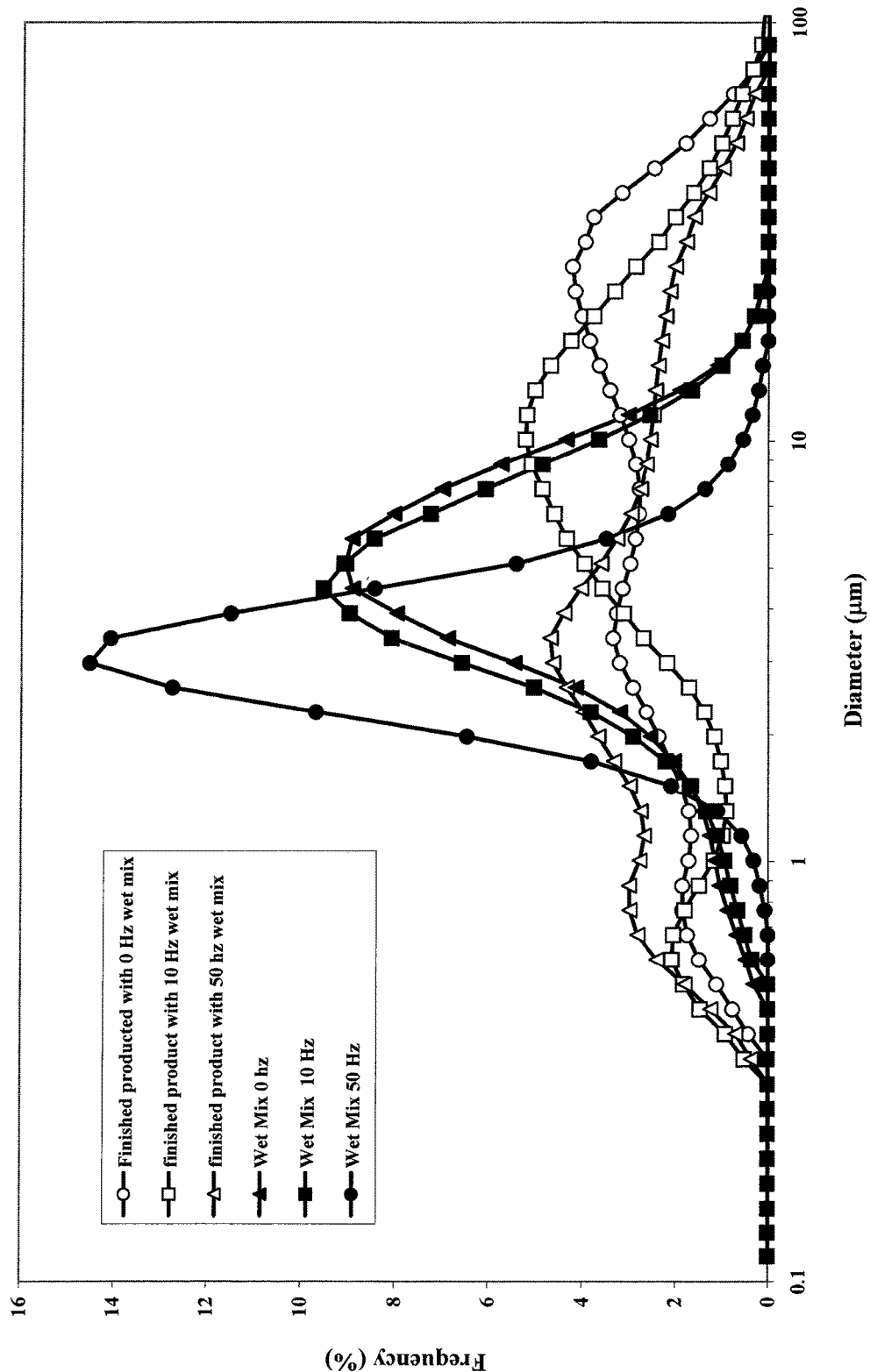
FIG. 4 is a graph of particle size.

The particle size of the sheared pre-mix and the particle size of the each final cheese sample after being blended with the cheese blend was measured similar to Example 1 and is provided in FIG. 4, which shows the bimodal particle size distribution of the wetmix and the resultant cheese of Samples 8, 9, and 10 from Table 8. Additional properties of the cheese are shown below in Table 8 below and measured similar to Example 1.

TABLE 8

| Sample # | % Total Protein in Premix | % of pre-sheared fat | Dispax setting (Hz) | firmness (g) | melt spread (in) | % free oil released | particle size peak maximum (um) Mode 1 | Mode 2 |
| --- | --- | --- | --- | --- | --- | --- | --- | --- |
| 2 | 11.5 | 41.9 | 0 | — | — | — | — | — |
| 3 | 11.5 | 41.9 | 10 | — | — | — | — | — |
| 4 | 11.5 | 41.9 | 50 | 488.1 | 2.0 | 26.7 | — | — |
| 5 | 18.1 | 39.6 | 0 | — | — | — | — | — |
| 6 | 18.1 | 39.6 | 10 | — | — | — | — | — |
| 7 | 18.1 | 39.6 | 50 | 586.2 | 1.8 | 26.7 | — | — |
| 8 | 18.3 | 33.9 | 0 | 523.3 | 1.9 | 23.3 | 3.5 | 25 |
| 9 | 18.3 | 33.9 | 10 | 518.4 | 1.9 | 26.7 | 0.75 | 10 |
| 10 | 18.3 | 33.9 | 50 | 496.9 | 1.7 | 20.00 | 0.75 | 3.5 |

Example 3

Figure 5:
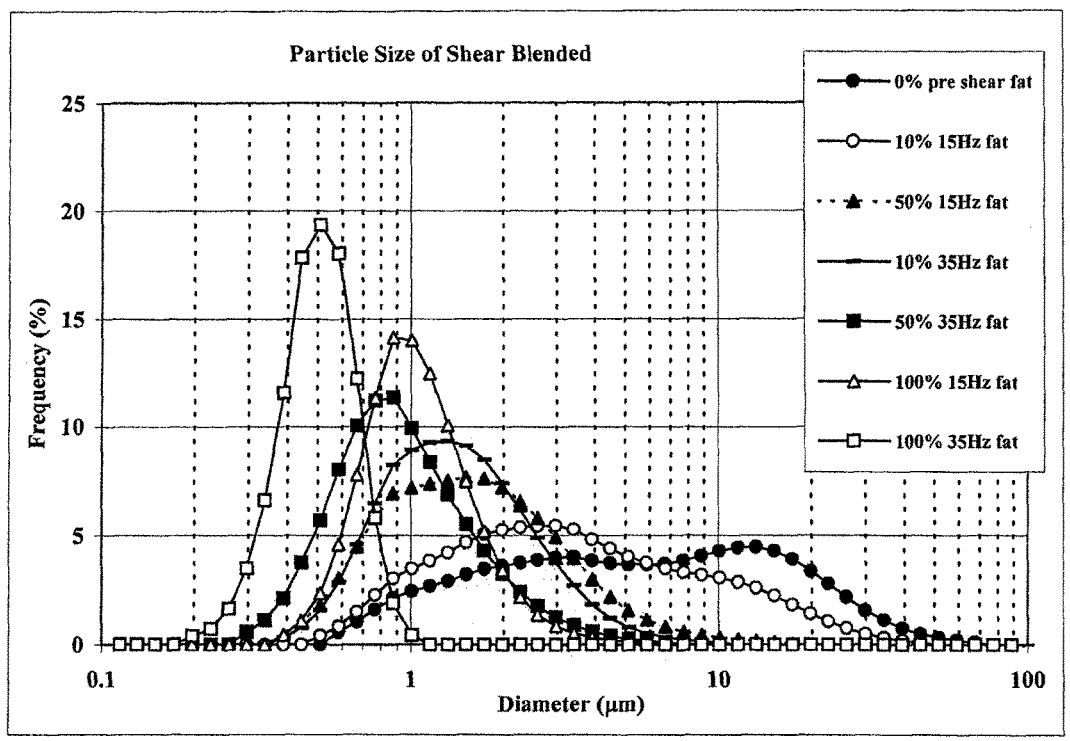
FIG. 5 is a graph of particle size.

In this Example an emulsifying salt-free process cheese was prepared that included all of its fat and other dairy ingredients sheared at either 15 or 35 hertz. Then, varying amounts of this sheared cheese was blended in a separate batch of emulsifying salt-free cheese that was not sheared at all. For this example, the emulsifying salt-free cheese had the following formula: about 10 percent young cheddar cheese, about 50 percent aged cheddar cheese, about 4.7 percent anhydrous milk fat, about 7.3 percent calcium reduced MPC, about 0.1 percent color, about 0.76 percent salt, about 0.05 percent sorbic acid, and about 27 percent water, and was prepared similar to the cheese of Example 1. A portion of this cheese blend was sheared using a high-shear in line dispenser (dispax, IKA USA) at either about 15 or 35 hertz. Then, varying amounts of the sheared cheese was blended with the non-sheared cheese as shown in Table 9 below. The particle size of the resultant cheese was measured similar to Example 1 and is provided in FIG. 5. Additional properties of the resultant cheese are shown below in Table 9 and measured similar to Example 1.

TABLE 9

| Sample # | % of pre-sheared fat | dispax setting (Hz) | firmness (g) | % free oil released | particle size peak maximum (um) Mode 1 | Mode 2 |
| --- | --- | --- | --- | --- | --- | --- |
| 1 | 0 | N/A | 670.488 | 0.01 | 3.4 | 13.3 |
| 2 | 10 | 15 | 662.770 | 0.01 | 3 | 10 |
| 3 | 10 | 35 | 814.026 | 0 | 1.3 | — |
| 4 | 30 | 15 | 783.550 | 0.01 | — | — |
| 5 | 30 | 35 | 913.803 | 0 | — | — |
| 6 | 50 | 15 | 739.813 | 0 | 1.5 | — |
| 7 | 50 | 35 | 998.798 | 0 | 0.88 | — |
| 8 | 100 | 15 | 747.064 | 0 | 0.88 | — |
| 9 | 100 | 35 | 823.031 | 0 | 0.51 | — |

Example 4

For this Example, Samples A and B were prepared using a wetmix that contained a whey protein concentrate powder, water, and half of the anhydrous milk fat added to the total formula. The other half of the anhydrous milk fat was added to the cheese blend portion. The wetmix for Sample A was not sheared while the wetmix for Sample B was homogenized at 2000 psi. Additionally, Samples C and D were prepared using a wetmix containing 100 percent of the anhydrous milk fat added to the total formula. The wetmix for Sample C was not sheared while the wetmix for Sample D was homogenized at 2000 psi. The wetmixes (Samples A-D) were then separately added to the rest of the emulsifying salt-free process cheese as explained in Example 1.

For the 50 percent fat and 100 percent fat sheared samples (Samples B and D, respectively), the finished emulsifying salt-free cheese showed a smaller, more cohesive melt spread with no visible fat separation upon melting while the samples containing the non-sheared wetmixes (Samples A and C) had non-homogenous melt appearances and substantial visible free fat when melted.

It will be understood that various changes in the details, materials, and arrangements of formulations and ingredients, which have been herein described and illustrated in order to explain the nature of the method and compositions, may be made by those skilled in the art within the principle and scope of the description and claims herein.

What is claimed is:

1. A method of making an emulsifying salt-free process cheese including a total amount of fat provided from both sheared and non-sheared fat, the method comprising:
    shearing a pre-mixture of a first portion of the total fat amount and dairy protein to generate an emulsion having sheared fat particles having a size between 1 and 10 microns;
    blending at least one cheese with a second portion of the total fat amount to form a uniform blend having non-sheared fat particles having a size between 10 microns and 100 microns;
    heating the uniform blend together with the emulsion; and
    mixing the emulsion having the sheared fat particles with the uniform blend having the non-sheared fat particles during one of the blending or the heating in a ratio of the sheared fat particles to the non-sheared fat particles from about 10:90 to about 50:50 to form an emulsifying salt-free cheese where one of the shearing, the ratio selection, and mixtures thereof is selected to produce the emulsifying salt-free process cheese with a bimodal particle size distribution, the emulsifying salt-free process cheese comprising from 10 percent to 50 percent first mode particles having a particle size of between 1 micron and 10 microns and from 50 percent to 90 percent second mode particles having a particle size between 10 microns and 100 microns.

2. The method of claim 1, wherein the shearing is homogenization at about 800 to about 4000 psi.

3. The method of claim 1, wherein the shearing is at a frequency of about 10 to about 50 hertz.

4. The method of claim 1, wherein the dairy protein is a calcium-reduced casein source having about 100 ppm to about 350 ppm of calcium per percent of casein.

5. The method of claim 1, wherein a percentage of particles in the first mode of particles is less than a percentage of particles in the second mode.

6. The method of claim 1, wherein the total amount of fat is from about 5 to about 35 percent with about 10 to about 50 percent of the fat being sheared and the remainder of the total fat being non-sheared.

7. The method of claim 6, wherein the emulsifying salt-free process cheese has a total amount of protein provided from the dairy protein in the pre-mixture and the dairy protein in the at least one cheese.

8. The method of claim 7, wherein the portion of the total dairy protein provided in the pre-mixture is sheared with the first portion of the total fat amount.

9. The method of claim 1, wherein the pre-mixture includes about 20 to about 45 percent fat, about 3 to about 20 percent dairy protein, and about 43 to about 65 percent water.

10. The method of claim 1, wherein the emulsifying salt-free process cheese has about 20 to about 33 percent of the total fat being sheared fat and about 1 to about 20 percent of the total protein being sheared protein, and the remainder of the total fat and the total protein being non-sheared.

11. An emulsifying salt-free process cheese having blends of protein and fat without emulsifying salts, the cheese comprising:
    at least one natural cheese or blends of natural cheese;
    a calcium reduced-casein source having about 100 to about 350 ppm calcium per percentage of casein;
    a total amount of protein provided from protein in the at least one natural cheese or blends of natural cheese and protein from the calcium-reduced casein source;
    about 5 to about 35 percent total fat provided from sheared fat and non-sheared fat in a ratio of the sheared fat to the non-sheared fat from about 10:90 to about 50:50;
    about 0.5 percent or less of emulsifying salts; and
    a bimodal particle size distribution comprising from 10 percent to 50 percent first mode particles having a particle size between 1 micron and 10 microns and from 50 percent to 90 percent second mode particles having a particle size between 10 microns and 100 microns.

12. The emulsifying salt-free process cheese of claim 11, wherein a percentage of particles in the first mode is less than a percentage of particles in the second mode.

13. The emulsifying salt-free process cheese of claim 11, wherein the emulsifying salt-free cheese includes about 20 to about 90 percent of the natural cheese and about 5 to about 20 percent of the calcium-reduced casein source.

14. The emulsifying salt-free process cheese of claim 11, wherein the emulsifying salt-free cheese has about 20 to about 33 percent of the total fat being sheared fat and about 1 to about 20 percent of the total protein being sheared protein, and the remainder of the total fat and the total protein being non-sheared.

* * * * *